Dec. 29, 1964 J. H. TEAF 3,163,837

MULTI-BAND, GANGED-CARRIAGE-DRIVEN SLUG TUNER EMPLOYING FLEXIBLE CONNECTION BETWEEN CARRIAGES

Filed Dec. 18, 1961 2 Sheets-Sheet 1

INVENTOR.
JOHN H. TEAF
BY
Busser Smith & Harding
ATTORNEYS

Dec. 29, 1964 J. H. TEAF 3,163,837

MULTI-BAND, GANGED-CARRIAGE-DRIVEN SLUG TUNER EMPLOYING FLEXIBLE CONNECTION BETWEEN CARRIAGES

Filed Dec. 18, 1961 2 Sheets-Sheet 2

INVENTOR.
JOHN H. TEAF
BY

ATTORNEYS 3,163,837

MULTI-BAND, GANGED-CARRIAGE-DRIVEN SLUG TUNER EMPLOYING FLEXIBLE CONNECTION BETWEEN CARRIAGES

John H. Teaf, Merchantville, N.J., assignor, by mesne assignments, to Thompson Ramo Wooldridge Inc., Euclid, Ohio, a corporation of Ohio Filed Dec. 18, 1961, Ser. No. 159,878
9 Claims. (Cl. 334—7)

This invention relates to radio tuners, and more particularly, to a multi-band tuning assembly.

The increase in popularity of FM radio listening and the increase in the number of FM stations across the country has led to a desirability for incorporating the FM band in automobile radios. However, the limitation of available space as well as considerations of cost have posed considerable problems in incorporating FM reception into present AM receivers. The present invention provides a compact and economical combination of AM and FM tuners which is particularly adapted for use in automobiles. However, the invention is obviously not limited to such use but could be employed equally well in other multi-band receivers, such as in multi-band short wave receivers or combined short-and-long wave receivers.

An object of the invention is to provide an economical and compact multi-band tuning assembly utilizing a common tuning means. A more specific object is the utilization of a single push button tuning asesmbly for multiple bands.

The attainment of the foregoing and other objects of the invention, particularly relating to details of construction and operation will become more fully apparent from the following description when read in conjunction with the accompanying drawings, in which.

Figure 1:
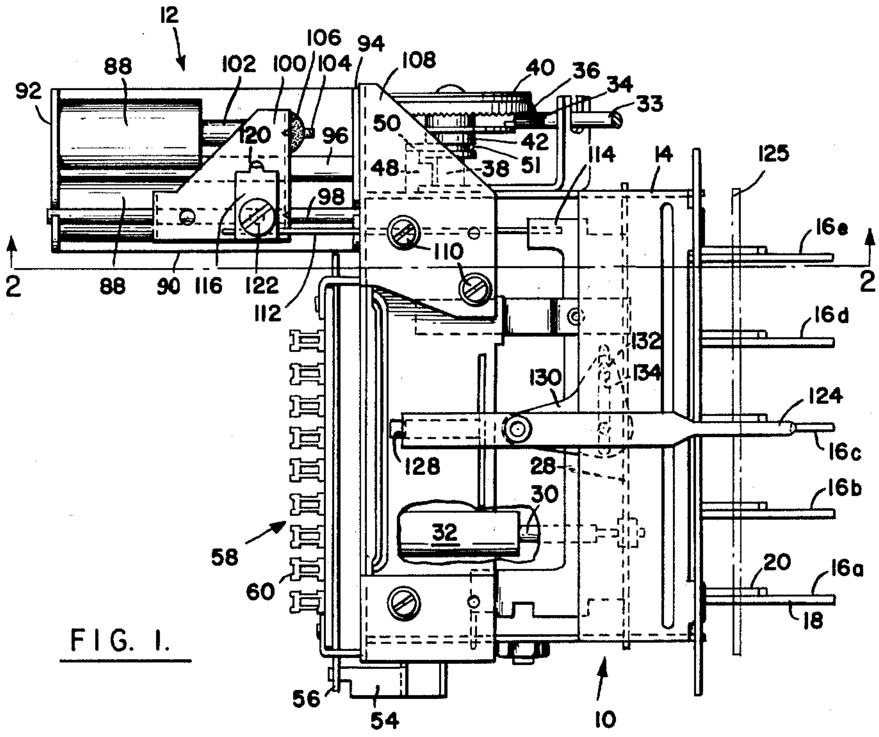
FIGURE 1 is a top plan view of a multi-band tuning assembly.
Figure 2:
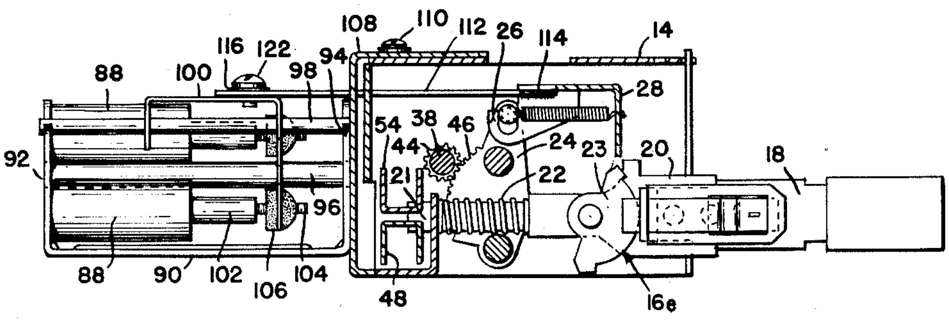
FIGURE 2 is a side elevational view, partly in section, taken on the surface indicated at 2—2 of FIGURE 1.

Referring first to the embodiment of the invention shown in FIGURES 1–4, FIGURE 1 illustrates the multi-band tuning assembly as being substantially L-shaped and as comprising an AM coil section 10 together with an FM coil section 12. AM coil section 10 includes a main frame 14 supporting push button assemblies **16*a*–16*e* each of which includes a first slide member 18, a second slide member 20 having a narrowed portion 21 surrounded by spring 22 and carrying an adjustable cam 23 which actuates paddle assembly 24 connected by means of yoke 26 to carriage 28, the latter reciprocating a plurality of slugs 30 within a plurality of tuning coils 32, one pair of which is shown in FIGURE 1. In addition to the actuation of the paddle assembly by means of slide members 18, tuning may also be effected by a conventional tuning knob which rotates shaft 33 and pinion 34 engaging drive gear 36, the latter transmitting rotation through friction disc 40 rigidly secured to the outer end of shaft 38. Drive gear 36 includes an integral collar 42 slidably journalled on shaft 38 for axial reciprocation relative thereto. As shown in FIGURE 2, the inner end of shaft 38 carries a gear 44 in mesh with teeth 46 of paddle assembly 24**.

Selection of a station may be accomplished by manual rotation of shaft 33 or by actuation of any one of assemblies **16*a*–16*e* However, when any one of the latter is actuated, drive gear 36 is automatically disengaged from contact with disc 40 by operation of clutch shifting member 48 slidably carried at opposite ends in slots in frame 14. Member 48 is biased to the left as viewed in FIGURE 3 by spring 49 so that arm 50, engaged in groove 51 of collar 42, normally maintains gear 36 in frictional engagement with disc 40. Member 48 further includes a plurality of cam surfaces 52*a*–52*e* positioned such that each is adapted to be engaged by one of end portions 21*a*–21*e* of push button assemblies 16*a*–16*e*. Thus, actuation of any one of the push button assemblies causes the respective end portion 21 to cam member 48 and gear 36 to the right as viewed in FIGURE 3 thereby disengaging the clutch and allowing shaft 33 to remain stationary during the oscillation of yoke 26 and the rotation of shaft 38**. The parts so far described are conventional in this art and accordingly are not described in detail.

A second slide member 54 carried at opposite ends in slots 55 in frame 14 is provided immediately above member 48 such that ends 21 of the push button assemblies also engage member 54. At this point, it may be assumed that push button assemblies **16*a*–16*c* are intended to be used for the selection of AM stations, whereas assemblies 16*d*–16*e* are intended to be used for the selection of FM stations. In order to accomplish this purpose, member 54 includes three curved cam surfaces 56*a*–56*c* each of which coacts with one of end portions 21*a*–21*c* to shift member 54 to the left and into the position illustrated in FIGURE 3 in which subsequent actuation of any one of assemblies 16*a*–16*c* will produce no further movement of slide 54 since end portions 21*a*–21*c* will merely slide along straight edges 58*a*–58*c*. Member 54 further includes curved cam surfaces 56*d*–56*e* which cooperate with ends 21*d*–21*e*, respectively, to cam member 54 to the right as viewed in FIGURE 3, in which position subsequent actuation of assemblies 16*d*–16*e* will produce no further movement of member 54 since end portions 21*d*–21*e* will merely slide along straight edges 58*d*–58*e*. Thus, member 54 is capable of being moved into a first, AM, position by operation of any one of assemblies 16*a*–16*c* assigned to AM stations in which position it will remain so long as various AM stations are being selected and from which position member 54 can be moved to a second, FM, position by actuation of FM assemblies 16*d* and 16*e*** in which second position it will remain as long as only FM stations are being selected.

Figure 3:
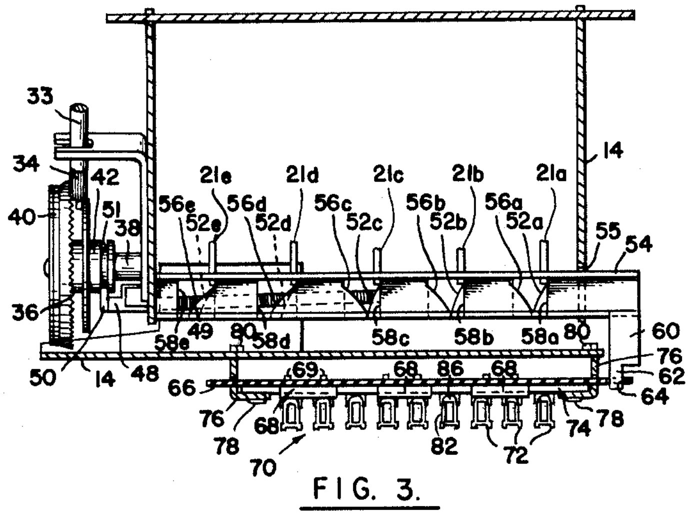
FIGURE 3 is a sectional view taken on the surface indicated at 3—3 of FIGURE 4.
Figure 4:
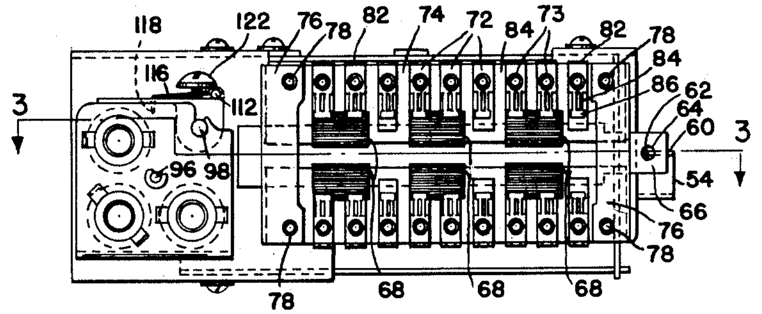
FIGURE 4 is a rear elevation of the assembly shown in FIGURE 1.

As further shown in FIGURES 3 and 4, member 54 includes an integral arm 60 having a narrowed portion 62 passing through aperture 64 in sliding switch plate 66, the latter being composed of an insulating material and having a plurality of conductive contact bridges 68 secured thereto by means of engaging tabs 69. Switch assembly 70 further includes a plurality of terminals 72 arranged in sets of three per contact bridge 68 such that the center terminal and one of the adjacent terminals are interconnected by a bridge 68 at any one time. Each of terminals 72 is rigidly secured by means such as rivets 73 to an insulated support board 74 which is secured at opposite ends to L-shaped brackets 76 by means such as rivets 78, which brackets, in turn, are secured to frame 14 by means such as engaging tabs 80. The illustrated terminals are shown to include connector portions 82, spring arm portions 84 and contact portions 86 all of which are integral and the latter of which is curved in cross-section so that bridges 68 may slide behind contact portions 86 biased thereagainst by spring portions 84. It will be understood that connector portions 82 are connected by leads to the various components of the receiver, the AM tuning coils 32 and the FM coils 88 in a manner such that the appropriate receiver components and the AM coils are interconnected in circuit when slide member 54 is cammed to its AM position, whereas, the appropriate receiver components and the FM coils are interconnected in circuit when slide member 54 is cammed to its FM position, the above recited movement of slide 54 occurring by reason of the actuation of the push button assemblies in the manner previously described. The circuits involved form no part of the present invention and are conventional.

Referring back to FIGURES 1 and 2, FM tuner section 12 includes a main frame 90 having upturned flanged portions 92 and 94 which serve to secure slide rods 96 and 98 upon which carriage 100 is mounted for reciprocation. Thus, tuning slugs 102 are caused to reciprocate within FM coils 88 by reason of their connection to carriage 100 through independently adjustable rods 104 and grommets 106, the independent adjustments being to effect proper tracking. The entire FM tuning section 12 is rigidly connected to AM tuning section 10 by means of bracket 108 and screws 110 which secure the bracket to main frame 14 of the AM section.

In order to effect the reciprocation of FM tuning slugs 102 within coils 88, a substantially stiff but slightly flexible rod or wire 112 is employed. One end of wire 112 is rigidly connected to carriage 28 as, for example, by soldering at 114. Wire 112 passes through suitable apertures in frame 14 and bracket 108 and is adjustably secured at its other end to carriage 100 by means of clamp 116, the latter including a tab portion 118 received in an aperture 120 in carriage 100 to prevent turning thereof. A screw 122 passes through clamp 116 and threadedly engages carriage 100 so that wire 112 is securely held between clamp 116 and carriage 100 when screw 122 is tightened.

As briefly stated in the preceding paragraph, wire 112 is substantially stiff but slightly flexible. By this it is meant that wire 112 is sufficiently stiff to transmit the reciprocation of carriage 28 to carriage 100 without bending under the small frictional drag force imposed by carriage 100. At the same time, the diameter of wire 112 is chosen such that the wire is not absolutely rigid but, rather, is somewhat flexible. That is, wire 112 is flexible to the extent that it may be slightly flexed to compensate for the slight misalignment of assemblies 10 and 12 caused by the thermal expansion and contraction of the frame members as well as any slight misalignment which might arise during the assembly of the components. In addition, wire 112 is preferably composed of a material having an extremely low coefficient of thermal expansion, such as constantin, so that the relative position of the carriages is maintained constant throughout a wide range of temperature change.

As shown in FIGURE 1, a pointer 124 is provided for indicating the position of the tuning assemblies with reference to multi-band scale 125. It will be readily understood that scale 125 is suitably calibrated with two sets of calibrations, one referring to the AM band and the other to the FM band. One end of pointer 124 terminates in a tab portion 126 which is bent relative to the remainder of the pointer and which is slidably received within slot 128 in frame 14. Intermediate of its ends, pointer 124 is pivotally connected to one arm of bell crank 130. The other arm of bell crank 130 carries a pin 132 which is slidable within slot 134 in carriage 28, the mid portion of crank 30 being pivotally connected to frame 14. Thus, when carriages 28 and 100 are reciprocated, the position of each is indicated by the right hand end of pointer 124 which executes a linear motion along scale 125.

After all of the above described components have been assembled and are in their respective positions as shown in FIGURE 1, tuning adjustment of the entire AM—FM assembly may be made as follows. First, carriage 28 is moved to a position such that pointer 124 indicates the frequency of a particular AM station and, with carriage 28 and pointer 124 held in this position, slugs 30 are adjusted for reception of this AM station. Of course, this adjustment is made with proper regard to the respective tracking between the slugs as well as their position relative to coils 32. This portion of the tuning operation is conventional in tuning AM receivers of the disclosed type. It will also be understood that once a first AM station has been properly tuned by the above procedure, the other AM stations will automatically be received when pointer 24 is adjacent their respective frequencies indicated on scale 25.

After the AM tuning has been accomplished, the FM tuning may be achieved in the following manner. First, screw 122 is loosened thereby unclamping the end of rod 112. Carriage 28 is then moved until pointer 24 indicates the position of a selected FM station on scale 125 and, with carriage 28 and pointer 124 held in this position, carriage 100 is moved to a position such that slugs 102 tune coils 88 for receiving the selected station. It is to be understood that shafts 104 have previously been adjusted to effect the proper tracking relationship between slugs 102. Once carriage 100 has been positioned so that the selected FM station is properly tuned, screw 122 is tightened thereby rigidly clamping rod 112 to carriage 100 and, thereafter, carriage 100 moves with the movement of carriage 28 so that the various positions of both carriages are always indicated by pointer 124 relative to their respective calibrations on scale 125. At this point, the tuning operation of the entire AM—FM assembly is completed and, subsequently, individual push buttons 16 may be set by adjusting the positions of cams 23 in the conventional manner.

In operation, actuation of any one of the push button assemblies will cause slide 48 to move to the right as viewed in FIGURE 3 thereby disengaging gear 36 from friction disc 40 to prevent rotation of shaft 33, and actuation of any one of the push button assemblies will also cause movement of carriage 28 by reason of the operation of cam 23 and paddle assembly 24. FM slugs 102 will also be moved due to the interconnection of carriages 28 and 100. However, cam surfaces *56a–56e* on slide element 54 will cause switch plate 66 and contact bridges 68 to move to one or the other of alternative positions such that only the AM coils 32 or the FM coils 88 will be connected to the receiver circuitry, the unconnected coils having no effect on the receiver circuitry irrespective of the positions of their cores.

From the foregoing description it will be apparent that the invention provides an extremely compact and economical multi-band tuner assembly which utilizes numerous common parts and wherein adjustment and the selection of AM and FM stations may be easily accomplished.

Figure 5:
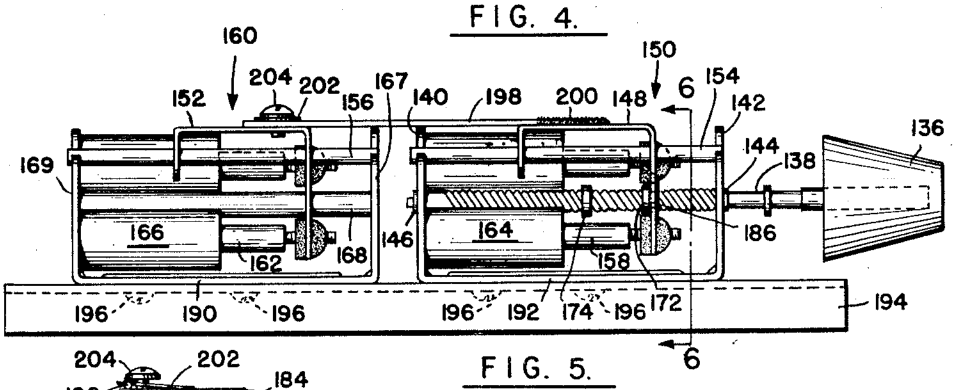
FIGURE 5 is a side elevation of an alternate form of tuner embodying the invention.
Figure 6:
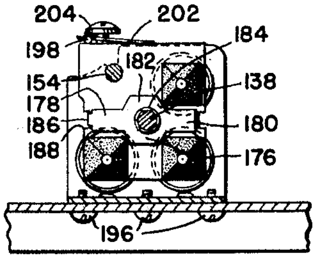
FIGURE 6 is a sectional view taken on the surface indicated at 6—6 of FIGURE 5.

In FIGURES 5 and 6 there is shown a second embodiment of the invention as applied to a plurality of tuners having different tuning ranges or for tuning different types of bands (e.g. FM and AM) which are actuated by means of a common manual tuning knob 136 in place of push button assemblies as in the first embodiment of the invention. Tuning knob 136 is rigidly secured to triple threaded shaft 138 which is journalled at opposite ends in flanges 140 and 142 and secured against axial movement by means of enlarged portion 144 and lock ring 146. It will be apparent that tuning assemblies 150 and 160 are substantially identical to tuning assembly 12 shown in FIGURES 1 and 2 and similarly include carriages 148, 152 slidably mounted on rods 154, 156 whereby tuning slugs 158 and 162 are reciprocated within coils 164 and 166, respectively. Tuning assembly 160 further includes a slide rod 168 secured at opposite ends in flanges 167, 169 which serves the same function as shaft 96 of assembly 12, whereas, tuning assembly 150 is provided with triple threaded shaft 138 in place of a corresponding slide rod 168. Carriage 148 is extruded at 172 and the internal bore of extrusion 172 is threaded for engagement by threaded shaft 138. The threaded portion of shaft 138 is also provided with a stop 174 which may comprise a split ring snapped in a groove turned in the threaded portion of the shaft.

In order to prevent backlash movement of carriage 148 relative to threaded shaft 138, a leaf spring 176 is provided. Spring 176 includes two oppositely extending arm portions 178, 180 and a central, enlarged portion 182 which is apertured for the reception of threaded shaft 138, the threads of which are engaged by radially inwardly extending projections 184. Arm portion 178 terminates in a tab 186 which is bent over the edge of a notch 188 in carriage 148 whereby rotation of spring 176 is prevented. Spring 176 is preferably composed of spring steel and is bowed such that arms 178, 180 bear against carriage 148 and projections 184 bear against the shaft threads. As a result, the threads within extrusion 172 are biased against the engaging shaft threads at all times, thereby preventing relative movement therebetween.

Each of tuner assemblies 150 and 160 is provided with a main frame 190 and 192, respectively, which frames are secured to a common chassis 194 by means of screws 196.

As in the first form of the invention, cariages 148 and 152 are mechanically interconnected by means of a rod or wire 198 which is substantially stiff but slightly flexible as previously defined in regard to wire 112. One end of wire 198 is rigidly secured to carriage 148 by means such as solder 200 and the other end is adjustably secured to carriage 152 by means of clamp 202 which is identical to clamp 116 previously described in detail. It will be understood that screw 204 is threaded into carriage 152 and that, by tightening screw 204, rod 198 is securely held between clamp 202 and carriage 152. In use, rod 198 performs the same function as that previously set forth in regard to rod 112 which is to provide mechanical interconnection between the assemblies while allowing for slight misalignment therebetween.

In operation, rotation of tuning knob 136 produces rotation of threaded shaft 138 which reciprocates carriage 148 by reason of its threaded reception in extrusion 172. The reciprocation of carriage 148 obviously effects reciprocation of slugs 158 and simultaneously reciprocates slugs 162 by reason of the interconnection provided by rod 198 between carriages 148 and 152. As in the first form of the invention, adjustment of the position of slugs 162 in coils 166 is easily effected without distributing the position of slugs 158 by simply loosening screw 204 and reciprocating carriage 152. After proper positioning of carriage 152, screw 204 is tightened and thereafter carriage 152 reciprocates with the movement of carriage 148. Of course, it will be readily understood that the position of both sets of slugs may be indicated by a common indicator relative to a multi-band or multi-range scale as in the first embodiment and that tuning assemblies 150 and 160 are electrically connected to the receiver circuitry through suitable switch means whereby the selective operation of one of the tuning assemblies may be achieved at any one time, the other tuning assembly being reciprocated but having no effect on the receiver circuitry.

From the foregoing disclosure it will be apparent that the invention provides an exceptionally compact and economical multi-band tuning assembly utilizing numerous common components which may be arranged in various other combinations in addition to the illustrated embodiments and it is obvious that three or more tuning assemblies may be interconnected in the above-described manner. The subject invention further provides an extremely simple and therefore economical solution to the problem of misalignment between tuners which is extremely critical in achieving accurate tuning throughout a wide range of ambient temperature conditions. In addition, it will be apparent that the subject invention provides for easy and accurate adjustment of all of the components relative to each other, thereby further lessening manufacturing as well as repair costs.

Having thus described two preferred embodiments of the invention, what is claimed is:

1. A multi-band tuning assembly including first and second sets of tuning coils for tuning first and second wave bands, first and second sets of slugs, first and second carriages mounting said first and second sets of slugs for tuning movements relative to said first and second sets of coils respectively, individual adjustment means connecting each of said slugs to its respective carriage for adjusting the position of each slug relative to the other slugs to effect proper tracking, and a rod interconnecting said first and second carriages for joint reciprocation, said rod being sufficiently stiff to transmit by both pushing and pulling actions reciprocating movement of said first carriage to said second carriage while being sufficiently flexible so as to compensate for relative misalignment between said carriages.

2. A multi-band tuning assembly including first and second sets of tuning coils for tuning first and second wave bands, first and second sets of slugs, first and second carriages mounting said first and second sets of slugs for tuning movements relative to said first and second sets of coils respectively, a rod having one end rigidly secured to one of said carriages, and adjustable connecting means securing the other end of said rod to said other carriage for adjusting the position of one set of slugs relative to the other set of slugs, said rod being sufficiently stiff to transmit by both pushing and pulling actions reciprocating movement of said first carriage to said second carriage and being sufficiently flexible so as to compensate for relative misalignment between said carriages.

3. The tuning assembly as claimed in claim 2 wherein said adjustable connecting means include an adjustable clamp securing said other end of said rod to said other carriage.

4. A multi-band tuning assembly including first and second sets of tuning coils for tuning first and second wave bands, first and second sets of slugs, first and second carriages mounting said first and second sets of slugs for reciprocation relative to said first and second sets of coils respectively, a rod interconnecting said first and second carriages for joint reciprocation, said rod being sufficiently stiff to transmit by both pushing and pulling actions reciprocating movement of said first carriage to said second carriage and being sufficiently flexible so as to compensate for relative misalignment between said carriages, and a plurality of push-button assemblies operatively connected to said first carriage whereby actuation of each of said push-button assemblies effects reciprocation of both of said first and second sets of slugs.

5. A multi-band tuning assembly including first and second sets of tuning coils for tuning first and second wave bands, first and second sets of slugs mounted for reciprocation relative to said first and second sets of coils respectively, a plurality of push-button assemblies for reciprocating said first set of slugs, a rod interconnecting said first and second sets of slugs, said rod being sufficiently stiff to transmit by both pushing and pulling actions reciprocation of said first set of slugs to said second set of slugs and being sufficiently flexible to compensate for misalignment between said first and second sets of slugs, a plurality of terminals connected to said coils, switch means for alternatively connecting predetermined sets of terminals, first actuator means connected to some of said push-button assemblies for moving said switch means in a first direction, and second actuator means connected to the other of said push-button assemblies for moving said switch means in a second direction.

6. A multi-band tuning assembly including first and second sets of tuning coils for tuning first and second wave bands, first and second sets of slugs, first and second carriages mounting said first and second sets of slugs for reciprocation relative to said first and second sets of coils respectively, a plurality of push-button assemblies for reciprocating said first carriage, means for transmitting reciprocation of said first carriage to said second carriage, a first group of terminals connected to the coils of said first set and a second group of terminals connected to the coils of said second set, switch means for alternatively engaging said first and second groups of terminals, an actuator connected to said switch, said actuator including first cam means engageable by some of said push-button assemblies for moving said switch means into engagement with said first group of terminals while tuning said first set of coils and slugs, and second cam means engageable by the other of said push-button assemblies for moving said switch into engagement with said second group of terminals while tuning said second set of coils and slugs.

7. A multi-band tuning assembly including first and second sets of tuning coils for tuning first and second wave bands, first and second sets of slugs, first and second carriages mounting said first and second sets of slugs for reciprocation relative to said first and second sets of coils respectively, a plurality of push-button assemblies for reciprocating said first carriage, a rod interconnecting said first and second carriages, said rod being sufficiently stiff to transmit by both pushing and pulling actions reciprocation between said carriages and being sufficiently flexible to compensate for misalignment between said carriages, a first group of terminals connected to the coils of said first set and a second group of terminals connected to the coils of said second set, switch means for alternatively engaging said first and second groups of terminals, an actuator connected to said switch, said actuator including first cam means engageable by some of said push-button assemblies for moving said switch means into engagement with said first group of terminals while tuning said first set of coils and slugs, and second cam means engageable by the other of said push-button assemblies for moving said switch into engagement with said second group of terminals while tuning said second set of coils and slugs.

8. A multi-band tuning assembly including first and second frame members rigidly supporting first and second sets of coils, first and second carriages slidably mounted on said first and second frame members respectively, a first set of slugs carried by said first carriage for tuning movements relative to said first set of coils, a second set of slugs carried by said second carriage for tuning movements relative to said second set of coils, a rod interconnecting said first and second carriages, said rod being sufficiently stiff to transmit by both pushing and pulling actions reciprocation of said first carriage to said second carriage and being sufficiently flexible to compenate for misalignment between said carriages, and a threaded shaft journaled in said first frame member and threadedly received by said first carriage for reciprocating both of said carriages upon rotation of said shaft.

9. A multi-band tuning assembly including, first and second sets of tuning coils for tuning first and second wave bands, first and second sets of slugs mounted for reciprocation within said first and second sets of tuning coils, respectively, a plurality of push button assemblies for actuating said first set of slugs, means interconnecting said first and second sets of slugs for transmitting the movement of said first set to said second set, a plurality of terminals, switch means for alternatively connecting predetermined sets of terminals, first actuator means for operating said switch means in a first direction connected to some of said push button assemblies and to said switch means, and second actuating means for operating said switch means in a second direction connected to the other of said push button assemblies and to said switch means.

References Cited in the file of this patent

UNITED STATES PATENTS

| | | |
|---|---|---|
| 2,706,787 | Sperber | Apr. 19, 1955 |
| 2,811,045 | Thompson | Oct. 29, 1957 |
| 2,867,765 | Klettke et al. | Jan. 6, 1959 |